(12) United States Patent
Xu et al.

(10) Patent No.: US 12,341,223 B2
(45) Date of Patent: Jun. 24, 2025

(54) ELECTRODE ASSEMBLY AND RELATED BATTERY, DEVICE, MANUFACTURING METHOD, AND MANUFACTURING DEVICE

(71) Applicant: CONTEMPORARY AMPEREX TECHNOLOGY (HONG KONG) LIMITED, Hong Kong (CN)

(72) Inventors: Hu Xu, Ningde (CN); Xing Li, Ningde (CN); Miaomiao Ren, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 252 days.

(21) Appl. No.: 17/817,998

(22) Filed: Aug. 8, 2022

(65) Prior Publication Data

US 2022/0384918 A1  Dec. 1, 2022

Related U.S. Application Data

(63) Continuation of application No. PCT/CN2021/076292, filed on Feb. 9, 2021.

(51) Int. Cl.
*H01M 50/538* (2021.01)
*H01M 10/0587* (2010.01)

(52) U.S. Cl.
CPC ..... *H01M 50/538* (2021.01); *H01M 10/0587* (2013.01)

(58) Field of Classification Search
CPC .................. H01M 50/538; H01M 10/0587
(Continued)

(56) References Cited

U.S. PATENT DOCUMENTS

| 2016/0141709 A1* | 5/2016 | Kim ................... H01M 10/049 29/623.2 |
| 2017/0084901 A1 | 3/2017 | Doo et al. |

(Continued)

FOREIGN PATENT DOCUMENTS

| CN | 207967188 U | 10/2018 |
| CN | 208256786 U | 12/2018 |

(Continued)

OTHER PUBLICATIONS

International Search Report received in corresponding Application PCT/CN2021/076292 on Oct. 18, 2021.
(Continued)

*Primary Examiner* — Jonathan G Jelsma
*Assistant Examiner* — Omar M Kekia
(74) *Attorney, Agent, or Firm* — K&L Gates LLP

(57) ABSTRACT

An electrode assembly and related battery, device, manufacturing method, and manufacturing device are provided. In some embodiments, the electrode assembly includes: a first electrode plate and a second electrode plate that are of opposite polarities, where an active material region of the first electrode plate and an active material region of the second electrode plate are wound to form a body portion, a non-active material region of the first electrode plate or a non-active material region of the second electrode plate is wound to form a tab, and the tab includes a bend portion bent against the body portion; and a guide piece. At least a part of the guide piece is located in the bend portion, and the guide piece is configured to guide an electrolytic solution into an interior of the body portion.

12 Claims, 9 Drawing Sheets

(58) Field of Classification Search
USPC .......................................................... 429/163
See application file for complete search history.

(56) References Cited

U.S. PATENT DOCUMENTS

| | | | | |
|---|---|---|---|---|
| 2019/0044103 | A1* | 2/2019 | Ogawa | H01M 50/533 |
| 2021/0135325 | A1* | 5/2021 | Li | H01M 10/0585 |
| 2021/0376428 | A1* | 12/2021 | Liang | H01M 50/54 |
| 2022/0149444 | A1* | 5/2022 | Otani | B64U 50/30 |

FOREIGN PATENT DOCUMENTS

| | | |
|---|---|---|
| CN | 209675429 U | 11/2019 |
| JP | 2019096392 A | 6/2019 |

OTHER PUBLICATIONS

English translation of International Search Report received in corresponding Application PCT/CN2021/076292 on Oct. 18, 2021.
Written Opinion received in corresponding Application PCT/CN2021/076292 on Oct. 18, 2021.
The extended European search report received in the corresponding European Application 21918119.5, mailed Apr. 14, 2023.

* cited by examiner

ELECTRODE ASSEMBLY AND RELATED BATTERY, DEVICE, MANUFACTURING METHOD, AND MANUFACTURING DEVICE

CROSS-REFERENCE TO RELATED APPLICATIONS

This application is a continuation of International Application No. PCT/CN2021/076292, filed Feb. 9, 2021, and entitled "ELECTRODE ASSEMBLY AND RELATED BATTERY, DEVICE, MANUFACTURING METHOD, AND MANUFACTURING DEVICE", which is incorporated herein by reference in its entirety.

TECHNICAL FIELD

Embodiments of this application relate to the field of batteries, and in particular, to an electrode assembly and related battery, device, manufacturing method, and manufacturing device.

BACKGROUND

Due to advantages such as a small size, a high energy density, a high power density, reusability for many cycles, and a long shelf life, batteries such as a lithium-ion battery are widely used in electronic devices, electrical means of transport, electrical toys, and electrical devices. For example, lithium-ion batteries have been widely used in products such as a mobile phone, a notebook computer, an electric power cart, an electric vehicle, an electric airplane, an electric ship, an electric toy car, an electric toy ship, an electric toy airplane, and a power tool.

With ongoing development of battery technology, higher requirements are posed on the performance of batteries. An electrolytic solution is a carrier of ion transport in a lithium ion battery. With lithium ions transported between a positive electrode plate and a negative electrode plate through the electrolytic solution, the lithium ions are intercalated and deintercalated normally between a positive active material region and a negative active material region. Therefore, the infiltration effect of the electrolytic solution for an active material in an electrode assembly is an important factor to ensure high performance of the battery.

For a jelly-roll electrode assembly, the electrolytic solution is transported into the electrode assembly through a gap between two adjacent layers of tabs, so as to infiltrate the active material regions of a positive electrode and a negative electrode. However, a tab of the electrode assembly usually forms a bend portion after being groomed, so as to reduce space occupied by the whole electrode assembly. Nevertheless, the bend portion formed by grooming the tab leads to the following consequence: ends of two adjacent tab layers abut against each other closely in a stacked structure and form a closed structure. The closed structure somewhat blocks a path for the electrolytic solution to enter a body portion from an external space of the tab, hinders sufficient infiltration of the active material regions of the positive electrode and the negative electrode, and adversely affects the battery performance significantly.

SUMMARY

In view of the foregoing problem, an embodiment provides an electrode assembly and related battery, device, manufacturing method, and manufacturing device to improve the infiltration effect of an electrolytic solution for an active material region and enhance battery performance.

According to a first aspect, an electrode assembly is provided. The electrode assembly includes: a first electrode plate and a second electrode plate that are of opposite polarities, where an active material region of the first electrode plate and an active material region of the second electrode plate are wound to form a body portion, a non-active material region of the first electrode plate or a non-active material region of the second electrode plate is wound to form a tab, and the tab includes a bend portion bent against the body portion; and a guide piece, where at least a part of the guide piece is located in the bend portion, and the guide piece is configured to guide an electrolytic solution into an interior of the body portion.

In the electrode assembly according to various embodiments, a guide piece is provided, and at least a part of the guide piece is located in the bend portion of the tab, thereby increasing a dimension of an opening at an end of the bend portion, enabling the electrolytic solution to smoothly pass through the opening, improving the infiltration effect of the electrolytic solution for the active material region, and effectively enhancing battery performance when applied to the battery.

In some embodiments, at least one first guide path is disposed at the guide piece and/or the bend portion. One end of the first guide path is in communication with an exterior space of the electrode assembly. The other end is in communication with the interior of the body portion. The guide piece is configured to guide the electrolytic solution into the interior of the body portion through the first guide path.

In those embodiments, the electrolytic solution can enter the interior of the body portion of the electrode assembly from an external space of the electrode assembly through the first guide path. In this way, the guide piece and/or the bend portion itself can serve to guide the electrolytic solution.

In some embodiments, the guide piece includes at least two guide units. A second guide path is formed between two adjacent guide units. The guide piece is configured to guide the electrolytic solution into the interior of the body portion through the second guide path.

In those embodiments, the electrolytic solution can further enter the interior of the body portion of the electrode assembly from the external space of the electrode assembly through a gap disposed between a plurality of guide units, thereby increasing entrance paths of the electrolytic solution and further improving the infiltration effect of the electrolytic solution in the electrode assembly. In addition, a plurality of guide units may be arranged regularly or irregularly, so that the design of the guide piece is more flexible.

In some embodiments, the guide piece includes a first part and a second part. The first part is located in the bend portion, and the second part is connected to an outer end of the first part and extends to an exterior space of the electrode assembly.

In those embodiments, the second part of the guide piece also serves to deflect a flow. Along the second part of the guide piece, the electrolytic solution in the external space of the electrode assembly can flow into the bend portion of the tab and then enter the interior of the body portion of the electrode assembly, thereby further improving the infiltration effect of the electrolytic solution for the active material region.

In some embodiments, the guide piece further includes a third part. The third part is connected to an inner end of the first part and extends to a space between the active material region of the first electrode plate and the active material region of the second electrode plate.

In those embodiments, the electrolytic solution can more easily flow from the interior of the bend portion of the tab into the interior of the body portion along the third part of the guide piece, thereby further improving the infiltration effect of the electrolytic solution for the active material region.

In some embodiments, the guide piece is made of an insulation material, and a through-hole available for passage of ions is provided in a thickness direction of the guide piece.

In those embodiments, the guide piece may be made of a material that is identical or similar to the material of the separator. In the case that the guide piece further includes a third part, the guide piece may serve the function of a separator, or at least a part of the separator forms the guide piece, thereby simplifying the manufacturing of the electrode assembly.

In some embodiments, the electrode assembly further includes a separator. The separator is located between the active material region of the first electrode plate and the active material region of the second electrode plate. The guide piece is attached to the separator, or the guide piece is spaced apart from the separator.

In those embodiments, when the separator is further disposed in the electrode assembly, the guide piece is designed more flexibly, and can be attached to the separator or spaced apart from the separator, without affecting the purpose and function of the separator.

In some embodiments, a deflecting region and a connecting region are disposed on an end face of the bend portion. The bend portion is connected to an external component through the connecting region. The bend portion is configured to guide the electrolytic solution into the interior of the body portion through the guide piece located in the deflecting region.

In those embodiments, a deflecting region and a connecting region are delineated on the end face of the bend portion. In this way, external components (such as electrode terminals) can be connected conveniently, and the guide piece in the deflecting region can guide the electrolytic solution into the interior of the body portion more effectively.

According to a second aspect, a battery cell is provided, including: the electrode assembly according to the foregoing embodiments; a shell, configured to accommodate the electrode assembly; and a terminal assembly, disposed on the shell and configured to connect to the bend portion to output or input electrical energy.

According to a third aspect, a battery is provided, including the battery cell according to the foregoing embodiments.

According to a fourth aspect, an electrical device is provided, including the battery according to the foregoing embodiments. The battery is configured to provide electrical energy.

According to a fifth aspect, a method for manufacturing an electrode assembly is provided. The method includes: providing a first electrode plate, a second electrode plate, and a guide piece, where the first electrode plate and the second electrode plate are of opposite polarities, and at least a part of the guide piece is disposed between the first electrode plate and the second electrode plate; winding the first electrode plate and the second electrode plate to form a jelly-roll structure, where an active material region of the first electrode plate and an active material region of the second electrode plate are wound to form a body portion, and a non-active material region of the first electrode plate or a non-active material region of the second electrode plate is wound to form a tab; and bending at least a part of the tab against the body portion to form a bend portion. At least a part of the guide piece is located in the bend portion, and the guide piece is configured to guide an electrolytic solution into an interior of the body portion.

According to a sixth aspect, a device for manufacturing an electrode assembly is provided. The device includes: an electrode plate placing module, configured to provide a first electrode plate, a second electrode plate, and a guide piece, where the first electrode plate and the second electrode plate are of opposite polarities, and at least a part of the guide piece is disposed between the first electrode plate and the second electrode plate; a winding module, configured to wind the first electrode plate and the second electrode plate to form a jelly-roll structure, where an active material region of the first electrode plate and an active material region of the second electrode plate are wound to form a body portion, and a non-active material region of the first electrode plate or a non-active material region of the second electrode plate is wound to form a tab; and a grooming module, configured to bend at least a part of the tab against the body portion to form a bend portion. At least a part of the guide piece is located in the bend portion, and the guide piece is configured to guide an electrolytic solution into the interior of the body portion.

The foregoing description is merely an overview of the technical solutions of the embodiments of this application. The following expounds specific embodiments of this application to enable a clearer understanding of the technical means of the embodiments of this application, enable implementation based on the content of the specification, and make the foregoing and other objectives, features, and advantages of the embodiments of this application more evident and comprehensible.

BRIEF DESCRIPTION OF DRAWINGS

By reading the following detailed description of exemplary embodiments, a person of ordinary skill in the art becomes aware of various other advantages and benefits. The drawings are merely intended to illustrate the exemplary embodiments, but not intended to limit this application. In all the drawings, the same reference numeral represents the same component. In the drawings.

DETAILED DESCRIPTION OF EMBODIMENTS

Reference Numerals

Figure 1:
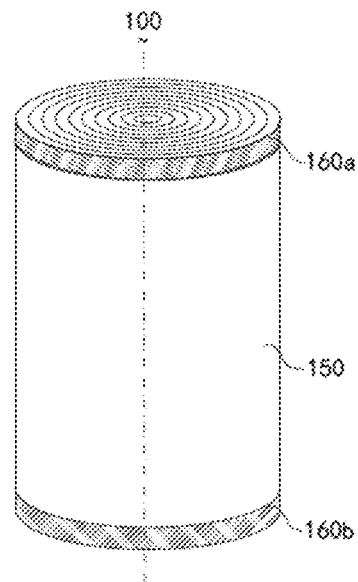
FIG. 1 is a three-dimensional schematic structural diagram of an electrode assembly according to some embodiments of this application.

Electrode assembly 100, first electrode plate 110, first active material region 111, first non-active material region 112, second electrode plate 120, second active material region 121, second non-active material region 122, guide piece 130, first part 131, second part 132, third part 133, guide unit 130a, separator 140, body portion 150, tab 160, first tab 160a, second tab 160b, bend portion 161, bend layer 161a, connecting portion 162, first guide path 171, guide hole 171a, guide slot 171b, second guide path 172, connecting region 181, deflecting region 182, central deflecting region 182a, peripheral deflecting region 182b; battery cell 200, shell 210, terminal assembly 220, electrode terminal 221, end cap 222; battery 300, box 310; electrical device 400, motor 401, controller 402, device 600 for manufacturing an electrode assembly, electrode plate placing module 601, winding module 602, grooming module 603.

To make the objectives, technical solutions, and advantages of the embodiments of this application clearer, the following gives a clear and complete description of the technical solutions in the embodiments of this application with reference to the drawings in the embodiments of this application. Apparently, the described embodiments are merely a part of but not all of the embodiments of this application. All other embodiments derived by a person of ordinary skill in the art based on the embodiments of this application without making any creative efforts fall within the protection scope of this application.

It needs to be noted that, unless otherwise specified, the technical terms used in embodiments of this application have the meanings commonly understood by a person skilled in the related art of embodiments of this application.

In the description of embodiments of this application, a direction or a positional relationship indicated by the terms such as "center", "longitudinal", "transverse", "length", "width", "thickness", "upper", "lower", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In addition, the technical terms such as "first" and "second" are used merely for descriptive purposes, but are not to be construed as indicating or implying relative importance or implicitly specifying the quantity of technical features indicated or denoting a specific sequence or order of preference. In the description of the embodiments of this application, unless otherwise expressly specified, "a plurality of" means two or more.

Reference to "embodiment" herein means that a specific feature, structure or characteristic described with reference to the embodiment may be included in at least one embodiment. Reference to this term in different places in the specification does not necessarily represent the same embodiment, nor does it represent an independent or alternative embodiment in a mutually exclusive relationship with other embodiments. A person skilled in the art understands that an embodiment described herein may be combined with other embodiments.

The term "and/or" herein describes a correlation between correlated objects and indicates three possible relationships. For example, "A and/or B" means: A alone, both A and B, and B alone. In addition, the character "/" herein generally indicates an "or" relationship between the object preceding the character and the object following the character.

"A plurality of" referred to in this application means two or more (including two). Similarly, "a plurality of groups" means two or more groups (including two groups), and "a plurality of pieces" means two or more pieces (including two pieces).

In the description of this application, unless otherwise expressly specified and qualified, the technical terms such as "mounting", "concatenation", "connection", and "fixing" need to be understood in a broad sense, for example, understood as a fixed connection or a detachable connection or understood as being integrated into a whole; or understood be as a mechanical connection or an electrical connection, a direct connection or an indirect connection implemented through an intermediary; or understood as interior communication between two components or interaction between two components. A person of ordinary skill in the art understands the specific meanings of the terms in the embodiments of this application according to the context.

In the description of various embodiments, unless otherwise expressly specified and defined, a first feature being "on" or "under" a second feature may mean that the first feature is in direct contact with the second feature, or the first feature is in indirect contact with the second feature through an intermediary. In addition, a first feature being "on", "above", or "over" a second feature may mean that the first feature is directly above or obliquely above the second feature, or just mean that the first feature is at an altitude higher than the second feature. A first feature being "under", "below", or "beneath" a second feature may mean that the first feature is directly under or obliquely under the second feature, or just mean that the first feature is at an altitude lower than the second feature.

An existing battery generally includes a housing and an electrode assembly accommodated in the housing, and the housing is filled with an electrolyte. The electrode assembly mainly includes a positive electrode plate and a negative electrode plate that are stacked together. Generally, a separator is disposed between the positive electrode plate and the negative electrode plate. The parts, coated with an active material, of the positive electrode plate and the negative electrode plate, constitute a body portion of the electrode assembly. The part, coated with no active material, of the positive electrode plate, constitutes a positive tab; and the part, coated with no active material, of the negative electrode plate, constitutes a negative tab. In a case of a lithium-ion battery, the positive electrode plate includes a positive current collector and a positive active material layer coated on both sides of the positive current collector. The positive current collector may be made of a material such as aluminum. The positive active material may be, for example, lithium cobalt oxide, lithium iron phosphate, ternary lithium, or lithium manganese oxide. The negative electrode plate includes a negative current collector and a negative active material layer coated on both sides of the negative current collector. The negative current collector may be made of a material such as copper. The negative active material may be, for example, carbon or silicon. The positive tab and the negative tab may be located at one end of the body portion together or at two ends of the body portion separately.

During charging and discharging of the battery, the positive active material and the negative active material of the body portion react with the electrolytic solution. The tabs are connected to electrode terminals to form a current loop. If the infiltration effect of the electrolytic solution for the active material is deficient, the positive or negative active material may participate in the reaction insufficiently, thereby affecting the efficiency of the electrode assembly and affecting battery performance. Therefore, the infiltration effect of the electrolytic solution for the active material in the electrode assembly is an important factor to ensure high performance of the battery.

Currently, to improve the infiltration effect of the electrolytic solution for the active material in the battery, a typical design solution is to coat a surface of the electrode plate with a material that improves the infiltration effect, or to change the material of the separator or a layered structure of the separator. However, such a design solution increases the cost of the electrode assembly and makes the manufacturing process more complicated.

In a process of processing and assembling the electrode assembly, a tab usually needs to groomed so that the tab is bent and deformed to facilitate connection between the tab and an electrode terminal and facilitate assembling of a battery cell. As found by the applicant of this application in practice, the grooming of the tab leads to the following consequence: ends of two adjacent tab layers abut against each other closely in a stacked structure and form a closed structure. The closed structure somewhat blocks a path for the electrolytic solution to enter a body portion from an external space of the tab, and adversely affects the infiltration effect of the electrolytic solution for the active material in the electrode assembly, thereby affecting the battery performance.

In view of the foregoing problems found, the applicant of this application has improved the structural design of the electrode assembly to improve the infiltration effect of the electrolytic solution for the active material in the electrode assembly and enhance battery performance. The following further describes each embodiment with reference to drawings.

Figure 2:
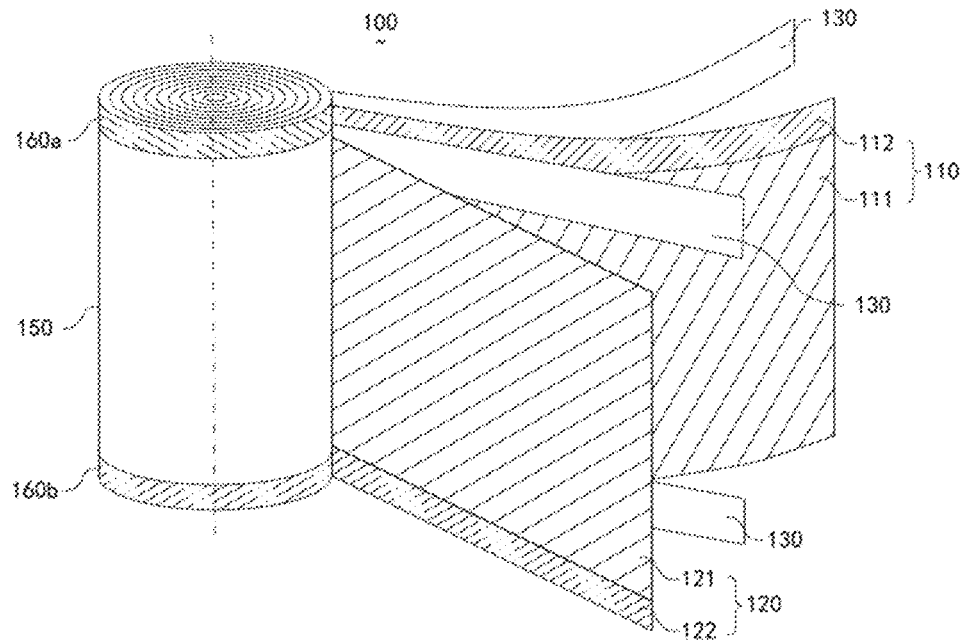
FIG. 2 is a schematic structural diagram of stacking and winding of an electrode assembly according to some embodiments of this application.

According to a first aspect, an electrode assembly 100 is provided. Referring to FIG. 1 and FIG. 2, FIG. 1 schematically shows a three-dimensional structure of an electrode assembly 100 according to some embodiments of this application; and FIG. 2 schematically shows a stacked jelly-roll structure of an electrode assembly 100 according to some embodiments of this application.

As shown in the drawings, the electrode assembly 100 includes a first electrode plate 110, a second electrode plate 120, and a guide piece 130. The polarity of the first electrode plate 110 is opposite to the polarity of the second electrode plate 120. For example, the first electrode plate 110 is a positive electrode plate, and the second electrode plate 120 is a negative electrode plate, or the converse applies. The first electrode plate 110 and the second electrode plate 120 are wound around a winding axis to form a jelly-roll structure.

A first active material region 111 (that is, a region coated with a first active material) and a first non-active material region 112 (that is, a region coated with no first active material) are disposed on the first electrode plate 110. A second active material region 121 (that is, a region coated with a second active material) and a second non-active material region 122 (that is, a region coated with no second active material) are disposed on the second electrode plate 120. The first active material and the second active material may be a positive active material and a negative active material respectively.

In the winding structure, the first active material region 111 of the first electrode plate 110 and the second active material region 121 of the second electrode plate 120 are wound to form a body portion 150. The first non-active material region 112 of the first electrode plate 110 is wound to form a first tab 160a, and the second non-active material region 122 of the second electrode plate 120 is wound to form a second tab 160b. After winding, at least a part of the guide piece 130 is located in a bend portion 161 of the tab (for example, the first tab 160a or the second tab 160b). The guide piece is configured to guide an electrolytic solution into the interior of the body portion 150.

Figure 3:
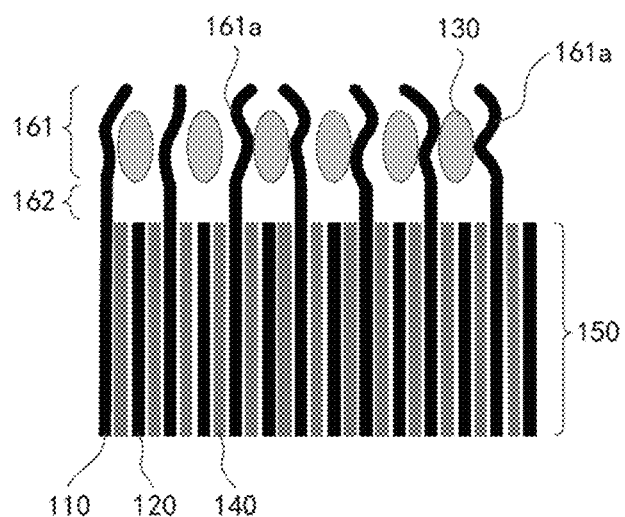
FIG. 3 is a schematic structural diagram of a partial cross section of an electrode assembly according to some embodiments of this application.

Further referring to FIG. 3, FIG. 3 schematically shows a partial sectional structure of an electrode assembly according to some embodiments of this application, and specifically, shows a partial sectional structure of an end at which the first tab 160a is located in a jelly-roll structure of the electrode assembly. A person skilled in the art understands that the end at which the second tab 160b is located may be structured similarly.

As shown in the drawing, the first tab 160a includes a bend portion 161 bent against the body portion 150. At least a part of the guide piece 130 is located in the bend portion 161. The guide piece 130 may serve as a spacer between adjacent bend layers 161a in the bend portion 161. The guide piece increases the dimension of the opening at the end of the bend portion 161 to some extent, so that the electrolytic solution can smoothly pass through the opening, thereby improving the infiltration effect of the electrolytic solution for the first active material region 111 and the second active material region 121. Such an electrode assembly 100 applied to a battery cell or a battery can improve the battery performance effectively.

In a specific embodiment shown in the drawing, the first tab 160a and the second tab 160b are located at two ends of the body portion 150 respectively. A person skilled in the art understands that what is shown in the drawing is merely an example. In other embodiments, instead, the first tab 160a and the second tab 160b may be located at different positions at the same end of the body portion 150, so that a tab region of the first tab 160a and a tab region of the second tab 160b are formed on one end face of the body portion 150.

In one embodiment shown in the drawing, the first electrode plate 110 and the second electrode plate 120 of the electrode assembly 100 are wound together to form a cylindrical stacked jelly-roll structure. The first tab 160a and the second tab 160b are located on two circular end faces of the body portion 150 respectively. A person skilled in the art understands that what is shown in the drawing is merely an example. In other embodiments, the electrode assembly 100 may be an oblate cylindrical or cuboidal stacked jelly-roll structure instead. Correspondingly, the first tab 160a or the second tab 160b may be located on an oblate or rectangular end face of one or two ends of the body portion 150.

In one embodiment shown in the drawing, the first tab 160a or the second tab 160b may include a bend portion 161 and a connecting portion 162. The bend portion 161 is bent against the body portion 150. The connecting portion 162 forms a connection between the body portion 150 and the bend portion 161, and is generally disposed vertically against the body portion 150. Understandably, instead of being vertical against the body portion 150, the connecting portion 162 may be disposed at a tilt angle to the body portion 150, and disposed slantwise toward the center of the winding axis. A person skilled in the art understands that what is shown in the drawing is merely an example. In other embodiments, instead, the first tab 160a or the second tab 160b may include no connecting portion 162, but the bend portion 161 is directly connected to the body portion 150. In other embodiments, the first tab 160a or the second tab 160b may further include other parts different from the body portion 161 and the connecting portion 162.

In this embodiment shown in the drawing, the electrode assembly 100 further includes a separator 140. The separator 140 is located in the body portion 150, and serves as a spacer between the first active material region 111 of the first electrode plate 110 and the second active material region 121 of the second electrode plate 120. In this way, the separator 140 can be spaced apart from the guide piece 130. A person skilled in the art understands that what is shown in the drawing is merely an example. In other embodiments, the separator 140 may abut against the guide piece 130, or may be attached to or partly overlap the guide piece 130, or may constitute a part of the guide piece 130.

Figure 4:
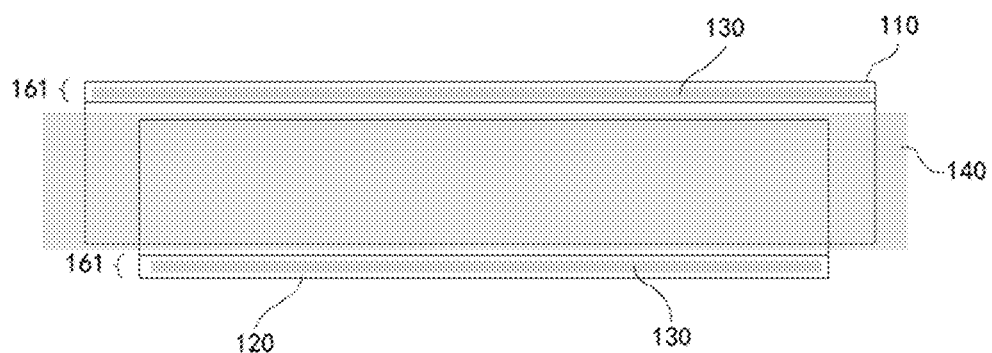
FIG. 4 is a schematic structural diagram of an electrode assembly before winding according to some embodiments of this application.

Still referring to FIG. 4, FIG. 4 schematically shows a structure of an electrode assembly 100 before winding according to some embodiments of this application.

As shown in the drawing, in the electrode assembly 100 before winding, the first active material region 111 of the first electrode plate 110 overlaps the second active material region 122 of the second electrode plate 120. The separator 140 serves as a spacer between the first active material region and the second active material region. The non-active material region 112 of the first electrode plate 110 and the non-active material region 122 of the second electrode plate 120 protrude from an upper end and a lower end respectively to form the first tab 160a and the second tab 160b respectively in the jelly-roll structure that is wound. The guide piece 130 is disposed at a position corresponding to the bend portion 161 on the first electrode plate 110 and the second electrode plate 120. In this way, in the jelly-roll structure that is wound, the guide piece 130 is located between adjacent bend layers 161a in the bend portion 161. Such a design enables the guide piece 130 to be arranged during a winding operation of the electrode assembly 100, thereby simplifying the process of manufacturing the electrode assembly 100.

In this embodiment shown in the drawing, the guide piece 130 is a one-piece structure, and is located as a whole in the bend portion 161. In such an embodiment, in the process of manufacturing the electrode assembly 100, the one-piece guide piece 130 may be placed between the first electrode plate 110 and the second electrode plate 120, and wound together with the first electrode plate 110 and the second electrode plate 120 to form a jelly-roll structure. At least a part of the guide piece 130 overlaps a part of the first non-active material region 112, or overlaps a part of the second non-active material region 122. In this way, after the winding and grooming operations, at least a part of the guide piece 130 is located in the bend portion 161.

A person skilled in the art understands that what is shown in the drawing is merely an example. In other embodiments, the guide piece 130 may include a plurality of parts, and may further include a part located outside the bend portion 161.

In the electrode assembly 100 according to some embodiments of this application, at least one first guide path 171 is disposed at the guide piece 130 and/or the bend portion 161 of the tab 160. One end of the first guide path 171 is in communication with an external space of the electrode assembly 100, and the other end is in communication with the interior of the body portion 150. Therefore, the electrolytic solution can be guided through the first guide path 171 and into the interior of the body portion 150 from the external space of the bend portion 161 of the tab 160.

Figure 5:
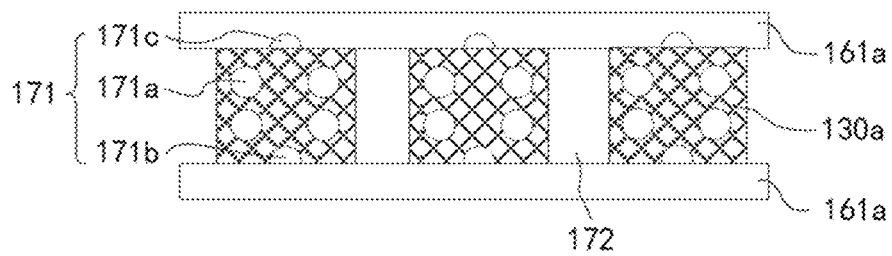
FIG. 5 is a schematic structural diagram of a partial cross section of an end face of a bend portion in an electrode assembly according to some embodiments of this application.

Refer to FIG. 5, which schematically shows a partial sectional structure of an electrode assembly 100 at a bend portion 161 according to some embodiments of this application.

As shown in the drawing, a guide hole 171a may be made on the guide piece 130, or a guide slot 171b may be provided on a sidewall of the guide piece 130. When the guide piece 130 is disposed inside the bend portion 161 of the tab 160 of the electrode assembly 100, the guide hole 171a and a gap between the guide slot 171b and the bend layer 161a can form the first guide path 171 to implement communication between the external space of the bend portion 161 and the interior of the body portion 150. A bend slot 171c may be provided on the bend portion 161. In this way, a gap between the bend slot 171c and the guide piece 130 can also constitute the first guide path 171 configured to implement communication between the external space of the bend portion 161 and the interior of the body portion 150. The bend slot 171c may be a slotted structure disposed on the tab 160 of the first electrode plate 110 or the second electrode plate 120, or may be formed by a wrinkle generated in a process of grooming the tab 160.

With the first guide path 171 made available, the electrolytic solution in the external space can enter the interior of the body portion 150 of the electrode assembly 100 more easily along the first guide path 171 after entering the bend portion 161 from an end opening of the bend portion 161 of the tab 160, thereby further improving the infiltration effect of the electrolytic solution for the active material in the electrode assembly 100.

In the embodiment shown in the drawing, the guide hole 171a, the guide slot 171b, and the bend slot 171c are all circular or semi-circular structures. A person skilled in the art understands that what is shown in the drawing is merely an example. In other embodiments, cross sections of the guide hole 171a, the guide slot 171b, and the bend slot 171c may be in other regular or irregular shapes, and the formed first guide path 171 may be a regular straight or arc-shaped path, or may be an irregular path. In addition, the direction of the first guide path 171 is identical to a local bending direction of the bend layer 161a, or may be another direction or a random direction, as long as one end of the first guide path 171 is in communication with the external space of the electrode assembly 100 and the other end is in communication with the interior of the body portion 150. For example, a through-hole may be made inside the guide piece 130, or the guide piece may be a porous structure with pores.

A person skilled in the art understands that, in other embodiments, the guide hole 171a, the guide slot 171b, and the bend slot 171c do not necessarily coexist, but a combination of one or more thereof may exist instead. For example, the guide hole 171a may be provided inside the guide piece 130, and the guide slot 171b may be provided on the sidewall concurrently; or, just the guide hole 171a is provided in the guide piece 130.

In the electrode assembly 100 according to some embodiments of this application, the guide piece 130 may further include at least two guide units 130a. A second guide path 172 is formed between two adjacent guide units 130a. The second guide path 172 implements communication between the interior of the body portion 150 and the external space of the bend portion 161, so that the electrolytic solution can be guided into the interior of the body portion 150 through the second guide path 172.

Figure 6:
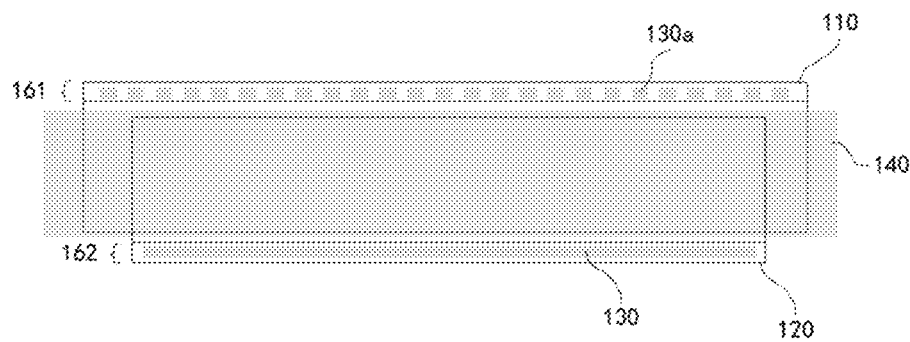
FIG. 6 is a schematic structural diagram of an electrode assembly before winding according to some embodiments of this application.

Still referring to FIG. 5 and further referring to FIG. 6, FIG. 6 schematically shows a structure of an electrode assembly 100 before winding according to some embodiments of this application.

As shown in FIG. 5, the guide piece 130 may include several guide units 130a. The guide units 130a are spaced out to form the second guide path 172 between the guide units 130a. The second guide path 172 implements communication between the external space of the bend portion 161 and the interior of the body portion 150. In this way, through the second guide path 172, the electrolytic solution outside the bend portion 161 can flow into the interior of the body portion 150.

As shown in FIG. 6, before the first electrode plate 110 and the second electrode plate 120 of the electrode assembly 100 are wound, several guide units 130a may be disposed at positions corresponding to the bend portions 161 of the tab 160. For example, the guide unit 130a may be attached to the tab 160. During the winding operation, the guide unit 130a is wound together with the first electrode plate 110. In the formed jelly-roll structure, the guide unit 130a is located in the bend portion 161. A gap between the guide units 130a forms the second guide path 172 in the bend portion 161. The second guide path 172 implements communication between the external space of the bend portion 161 and the interior of the body portion 150. In this way, through the second guide path 172, the electrolytic solution is allowed to enter the interior of the body portion 150 from outside the bend portion 161.

In this embodiment shown in the drawing, the guide units 130a are square-shaped structures arranged at equal intervals. A person skilled in the art understands that what is shown in the drawing is merely an example. In other embodiments, the guide units 130a may be in other shapes instead, such as regular or irregular block or strip structures. Each guide unit 130a may be arranged in a regular array, or scattered irregularly. The guide units 130a may be in the same shape or different shapes, and may be arranged in the same way or different ways, as long as the second guide path 172 can be formed between two adjacent guide units 130a.

In addition, a person skilled in the art understands that it is not necessary to space out any two guide units 130a, and some guide units 130a may abut each other without a gap in between.

The guide piece 130 that includes several guide units 130a increases design flexibility of the guide piece 130. For example, before the first electrode plate 110 and the second electrode plate 120 are wound in a process of manufacturing the electrode assembly 100, at least two guide units 130a may be disposed on a surface of the first electrode plate 110, or at least two guide units 130a may be disposed on a surface of the second electrode plate 120. At least a part of the guide units 130 may be disposed in the first non-active material region 112 or the second non-active material region 122. In this way, after the winding and grooming operations, at least a part of the guide piece 130 formed by several guide units 130a is located in the bend portion 161.

A person skilled in the art also understands that, in some embodiments, the first guide path 171 and the second guide path 172 may coexist, so as to increase the paths for the electrolytic solution to enter the interior of the body portion 150 from the external space of the bend portion 161, and further improve the infiltration effect of the electrolytic solution for the active material in the electrode assembly 100. For example, when the guide piece 130 includes at least two guide units 130a and a second guide path 172 is formed between the guide units 130a, a guide hole 171a or a guide slot 171b may be provided on the guide units 130a, or the guide units 130a may be made of a porous-structured material, so as to form a first guide path 171 in the bend portion 161 of the tab 160.

In the electrode assembly 100 according to some embodiments, all the guide pieces 130 may be located in the bend portion 161 of the tab 160. In other embodiments, the guide piece 130 may include a part outside the bend portion 161 in addition to the part in the bend portion 161 of the tab 160.

In the electrode assembly 100 according to some embodiments of this application, the guide piece 130 may include a first part 131 and a second part 132. The first part 131 is located in the bend portion 161 of the tab 160. The second part 132 is connected to an outer end of the first part 131, and extends to the external space of the electrode assembly 100.

Figure 7:
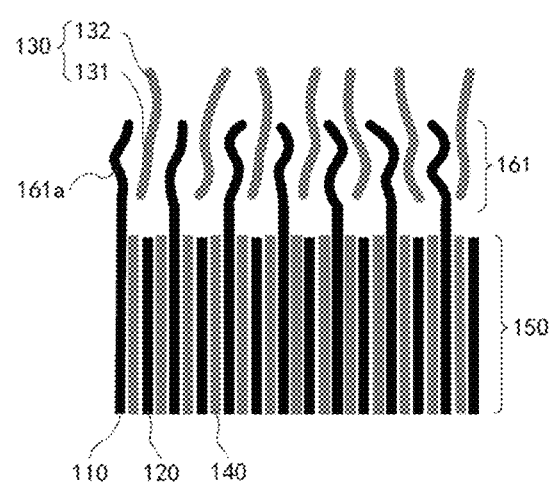
FIG. 7 is a schematic structural diagram of a partial cross section of an electrode assembly according to some embodiments of this application.
Figure 8:
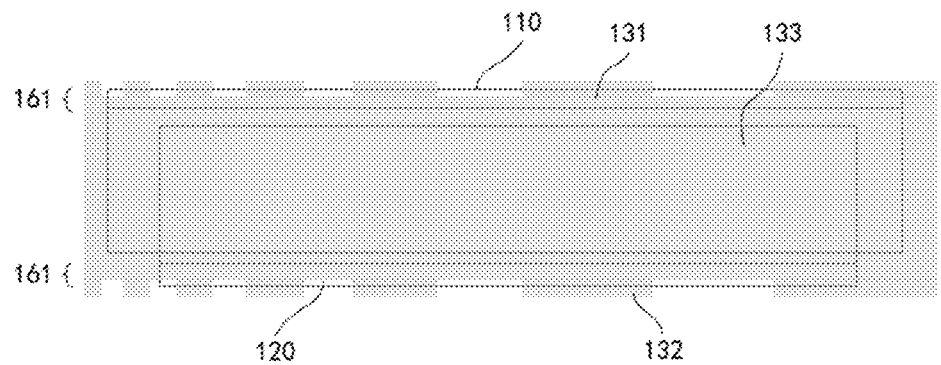
FIG. 8 is a schematic structural diagram of an electrode assembly before winding according to some embodiments of this application.

Referring to FIG. 7 and FIG. 8, FIG. 7 schematically shows a partial sectional structure of an electrode assembly 100 according to some embodiments of this application, and specifically shows a partial sectional structure of an end at which a first tab 160a is located in a jelly-roll structure of an electrode assembly 100. FIG. 8 schematically shows a structure of an electrode assembly 100 before winding according to some embodiments of this application.

As shown in FIG. 7, the guide piece 130 includes a first part 131 and a second part 132. The first part 131 is located in the bend portion 161. The second part 132 is connected to an outer end of the first part 131, and extends outward to an external space of the electrode assembly 100. The second part 132 of the guide piece 130 serves a purpose of deflecting a flow. Along the second part 132 of the guide piece 130, the electrolytic solution in the external space of the electrode assembly 100 can be deflected into an opening at an end of the bend portion 161 of the tab 160. Further, along the first part 131 of the guide piece 130, the electrolytic solution is guided into the interior of the body portion 150 of the electrode assembly 100. Such a design helps to further improve the infiltration effect of the electrolytic solution for the active material in the electrode assembly 100, and makes it convenient for the electrolytic solution to enter the opening at the end of the bend portion 161.

As shown in FIG. 8, before the first electrode plate 110 and the second electrode plate 120 of the electrode assembly 100 are wound, a part of the guide piece 130 may be set to protrude beyond the bend portion 161 of the tab 160. In the jelly-roll structure that is wound, a part that is of the guide piece 130 and that protrudes from the bend portion 161 constitutes the second part 132 of the guide piece 130. In the wound electrode assembly, the second part 132 covers the bend portion 161.

In this embodiment shown in the drawing, the second part 132 of the guide piece 130 may be formed by die-cutting. Such an embodiment does not limit the material of the guide piece 130. At the die-cut part, the bend portion 161 of the tab 160 is exposed to ensure that the bend portion 161 of the tab 160 can be attached to an external component such as an electrode terminal. A person skilled in the art understands that what is shown in the drawing is merely an example. In other embodiments, the guide piece 130 needs no die-cutting. In this case, the second portion 132 can be electrically connected to the external component. In such an embodiment, the guide piece 130 may be set to be partly or entirely made of a conductive material (such as a conductive metal), or an outer surface of the guide piece 130 is entirely or partly coated with a conductive material. In this way, an external component such as an electrode terminal can be attached to the second part 132 that is of the guide piece 130 and that protrudes from the bend portion 161, and thereby can be electrically connected to the bend portion 161 of the tab 160.

In this embodiment shown in the drawing, the first part 131 is attached to the second part 132 of the guide piece 130, and the guide piece 130 is an integrated structure. A person skilled in the art understands that what is shown in the drawing is merely an example. In other embodiments, when the guide piece 130 includes the first part 131 and the second part 132, the guide piece 130 may be a multi-piece structure, for example, may include at least two guide units 130a. At least one guide unit 130a may include a part that extends to the external space of the electrode assembly 100, so as to constitute the second part 132 of the guide piece 130.

In the electrode assembly 100 according to some embodiments of this application, the guide piece 130 may further include a third part 133 connected to an inner end of the first part 131. The third part 133 extends into the body portion 150, that is, extends to a space between the first active material region 111 of the first electrode plate 110 and the second active material region 121 of the second electrode plate 120.

Figure 9:
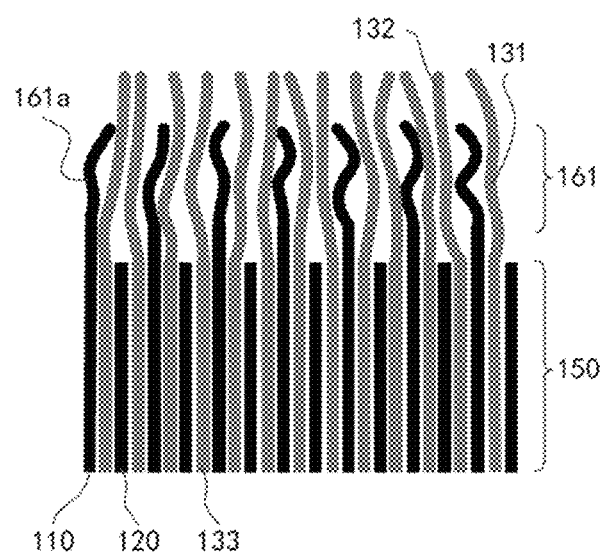
FIG. 9 is a schematic structural diagram of a partial cross section of an electrode assembly according to other embodiments of this application.
Figure 10:
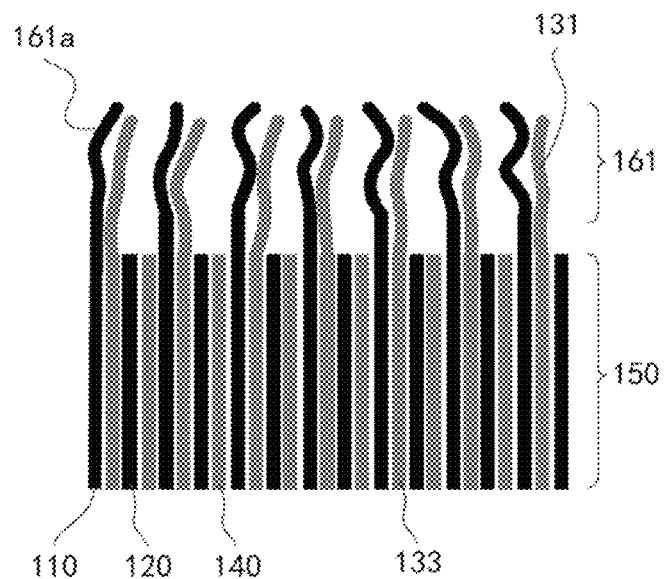
FIG. 10 is a schematic structural diagram of a partial cross section of an electrode assembly according to other embodiments of this application.

Still referring to FIG. 8, and further referring to FIG. 9 and FIG. 10, FIG. 9 and FIG. 10 schematically show a partial sectional structure of an electrode assembly 100 according to some embodiments of this application, and specifically, show a partial sectional structure of an end at which the first tab 160a is located in a jelly-roll structure of the electrode assembly 100.

As shown in the drawing, the guide piece 130 may further include a third part 133. The third part 133 may be connected to the inner end of the first part 131, and extend into the body portion 150, so as to extend to a space, and serve as a spacer, between the first active material region 111 of the first electrode plate 110 and the second active material region 121 of the second electrode plate 120.

In this embodiment, the third part 133 can continue the infiltration path of the electrolytic solution. Therefore, the electrolytic solution in the bend portion 161 can more easily enter the interior of the body portion 150 of the electrode assembly 100 along the third part 133 of the guide piece 130, so as to infiltrate the active material in the first active material region 111 and the second active material region 121. In this way, during the charging and discharging of the battery, the electrode active material can contact the electrolytic solution more sufficiently and participate in reactions more sufficiently, thereby helping to further improve the battery performance.

In this embodiment shown in the drawing, the third part 133 serves as a spacer between all the first active material region 111 and all the second active material region 121. Such an embodiment is conducive to sufficient infiltration of the electrode assembly by the electrolytic solution. However, a person skilled in the art understands that what is shown in the drawing is merely an example. In other embodiments, the third part 133 of the guide piece 130 may just extend to a part of the region between the first active material region 111 and the second active material region 121.

It should be noted that in the electrode assembly 100 according to some embodiments of this application, the second part 132 and the third part 133 of the guide piece 130 do not necessarily coexist. In other words, in some embodiments, the guide piece 130 may just include the first part 131. In some embodiments, the guide piece 130 may include the first part 131 and the second part 132. In some embodiments, the guide piece 130 may include the first part 131 and the third part 133. In some embodiments, the guide piece 130 may include the first part 131, the second part 132, and the third part 133.

Generally, the electrode assembly 100 further includes a separator. The separator is made of an insulation material, and is generally located in the body portion 150 of the electrode assembly 100. The separator serves as a spacer between the active material region of the first electrode plate 110 and the active material region of the second electrode plate 120, and is configured to dielectrically isolate the first electrode plate 110 from the second electrode plate 120. The separator is generally made of a material such as polypropylene (PP) or polyethylene (PE). Micron-scale or nanometer-scale pores exist in the separator to allow passage of metal ions during the charging and discharging of the battery.

In the electrode assembly 100 according to some embodiments of this application, the guide piece 130 may be made of an insulation material. A through-hole available for passage of ions may be provided in a thickness direction of the guide piece. In this way, the guide piece 130 and the separator can be made of the same material. This particularly helps to simplify the manufacturing process of the electrode assembly 100 and reduce cost.

Still referring to FIG. 8 and FIG. 9, in this embodiment shown in the drawing, when the guide piece 130 is made of an insulation material and a through-hole available for passage of ions is provided in the thickness direction of the guide piece, the third part 133 of the guide piece 130 can also serve a function of the separator. In this way, the guide piece 130 serves a double function of flow guiding and separation, particularly helping to simplify the manufacturing process of the electrode assembly 100 and reducing cost.

A person skilled in the art understands that, in embodiments that adopt a solution in which the guide piece 130 is made of an insulation material such as polypropylene (polypropylene, PP) and polyethylene (polyethylene, PE) and a through-hole available for passage of ions is provided in the thickness direction of the guide piece, the solution does not mean that an additional separator is necessarily precluded from being disposed in the electrode assembly 100 according to those embodiments. Therefore, the third part 133 of the guide piece 130 in the electrode assembly 100 may serve as a separator, or an additional separator 140 may be disposed in the electrode assembly 100.

In the electrode assembly 100 according to some embodiments of this application, the electrode assembly 100 may further include the separator 140. The separator 140 is located between the first active material region 111 of the first electrode plate 110 and the second active material region 121 of the second electrode plate 120. The guide piece 130 may be attached to the separator 140, or the guide piece 130 may be spaced apart from the separator 140 instead.

Referring back to FIG. 2 to FIG. 4 as well as FIG. 6 and FIG. 7, in various embodiments shown in the drawings, the electrode assembly 110 further includes a separator 140. The separator 140 is spaced apart from the guide piece 130. Referring back to FIG. 10, in this embodiment shown in the drawing, the guide piece 130 in the electrode assembly 110 is attached to the separator 140. In those embodiments, the guide piece 130 and the separator 140 may be made of the same material or different materials. The shape and structure of the guide piece 130 can be designed as required without affecting the separator 140, thereby improving flexibility of designing the guide piece 130 and the electrode assembly 100.

In the electrode assembly 100 according to some embodiments of this application, a connecting region 181 and a deflecting region 182 may be disposed on an end face of the bend portion 161 of the electrode assembly 100. The bend portion 161 is connected to an external component through the connecting region 181. The bend portion 161 is configured to guide the electrolytic solution into the interior of the body portion 150 through the guide piece 130 located in the deflecting region 182.

Figure 11:
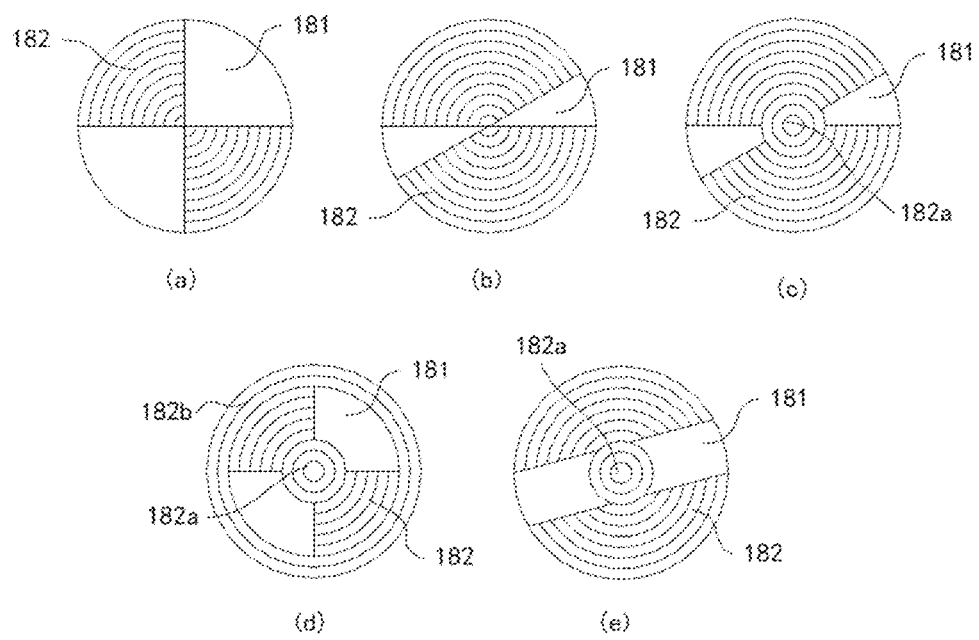
FIG. 11 is a schematic structural diagram of an end face of a bend portion in an electrode assembly according to some embodiments of this application.

Refer to FIG. 11, which schematically shows several structures of an end face of the bend portion 161 in an electrode assembly 100 according to some embodiments of this application.

As shown in the drawing, to facilitate connection between the bend portion 161 in the tab 160 in the electrode assembly 100 and an external component such as an electrode terminal, a connecting region 181 may be provided on an end face of the bend portion 161. A surface of the connecting region 181 is made of a conductive material, so as to facilitate electrical connection of the electrode terminal. A person skilled in the art understands that the bend portion 161 may be connected to the electrode terminal through a connector adapter instead. For example, the bend portion 161 in the connecting region 181 is directly welded to the connector adapter, and the connector adapter is directly welded to the electrode terminal. The remaining part of the end face of the bend portion 161 may constitute a deflecting region 182. Therefore, the guide piece 130 in the deflecting region 182 is configured to guide the electrolytic solution also into the interior of the body portion 150.

Because the connecting region 181 does not necessarily participate in deflecting the electrolytic solution, ends of adjacent bend layers 161*a* in the connecting region 181 located on the end face of the bend portion 161 may be closed structures. For example, no guide piece 130 is disposed in the bend portion 161 of such a connecting region 181.

A person skilled in the art understands that, in other embodiments, the ends of a part of adjacent bend layers 161*a* in the connecting region 181 may be open structures instead, so that the guide piece 130 can be disposed in such part of the bend portion 161. The guide piece 130 may be made of an insulation material or a conductive material, or may be coated with a conductive material on a surface, so as to facilitate electrical connection between the connecting region 181 and an external component.

A person skilled in the art understands that, in other embodiments, the guide piece 130 in a part of the bend portion 161 in the connecting region 181 may include a second part 132 extending to the external space of the bend portion 161. In those embodiments, optionally, the guide piece 130 is made of a conductive material or coated with a conductive material on a surface, so as to facilitate electrical connection to an external component. In some embodiments, the guide piece 130 in a part of the bend portion 161 in the deflecting region 182 may possess only the first part 131 or may possess the second part 132 additionally.

As shown in the drawing, in an embodiment in which the electrode assembly 100 is a cylinder and the end face of the electrode assembly 100 is circular, the connecting region 181 or the deflecting region 182 may be sector-shaped, as shown in (a) and (b) in the drawing; or rectangular, as shown in (e) in the drawing; or annular sector-shaped, as shown in (c) and (d) in the drawing; or in other shapes. In addition, the connecting region 181 or the deflecting region 182 each may include one or more regions. The regions may be distributed symmetrically or asymmetrically.

In some embodiments shown in the drawings, as shown in (c), (d), and (e) in the drawing, the deflecting region 182 may further include a central deflecting region 182*a* and/or a peripheral deflecting region 182*b*. The central deflecting region 182*a* is located at a central region of the end face. The peripheral deflecting region 182*b* is located at a peripheral region of the end face. Those embodiments are particularly advantageous when the guide piece 130 further includes a third part 133 or when the guide piece 130 also serves as a separator. That is because the first electrode plate 110 and/or the second electrode plate 120 are usually not provided at positions corresponding to the central deflecting region 182*a* and the peripheral deflecting region 182*b*. With the guide piece 130 and the deflecting region 182 disposed at such positions, the electrolytic solution is enabled to enter blank regions of the first electrode plate 110 or the second electrode plate 120 in the electrode assembly 100. In this way, the electrode active material in the body portion 150 of the electrode assembly 100 can be sufficiently immersed in the electrolytic solution to further improve the infiltration effect.

Figure 12:
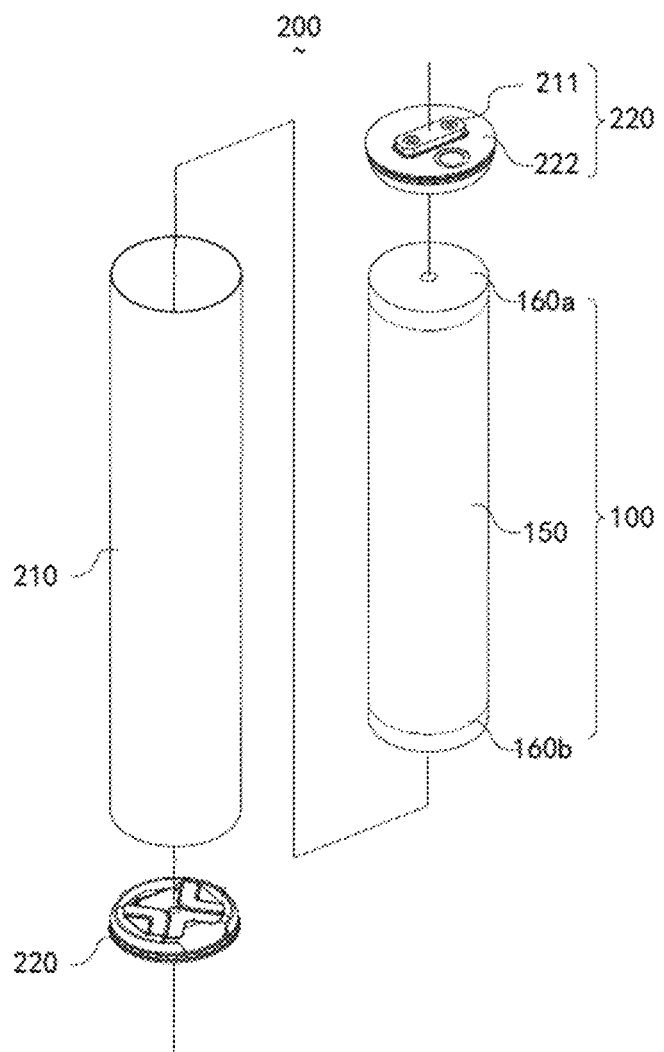
FIG. 12 is a schematic structural exploded view of a battery cell according to some embodiments of this application.

According to a second aspect, a battery cell 200 is further provided. Refer to FIG. 12, which schematically shows a breakdown structure of a battery cell 200 according to some embodiments of this application.

As shown in the drawing, the battery cell 200 includes the electrode assembly 100 according to the foregoing embodiment, a shell 210, and a terminal assembly 220. The shell 210 is configured to accommodate the electrode assembly 100. The terminal assembly 220 is disposed on the shell 210 and is configured to connect to the tabs 160*a* and 160*b* separately, especially, connect to the bend portions 161 of the tabs separately, so as to output or input electrical energy.

In this embodiment shown in the drawing, the battery cell 200 includes an electrode assembly 100, a shell 210, and a terminal assembly 220 disposed on the shell 210. The shell 210 is a hollow structure, and is configured to accommodate the electrode assembly 100. A person skilled in the art understands that what is shown in the drawing is merely an example. In other embodiments, the battery cell 200 may include a plurality of electrode assemblies 100, and the terminal assembly 200 may be designed according to the number and arrangement of the electrode assemblies 100. In addition, depending on the shape and arrangement of the electrode assembly 100 and the manner of combining a plurality of electrode assemblies 100, the shell 210 may be a cylinder, a flat object, a cuboid, or another shape.

In some embodiments, the shell 210 may be a hollow housing with an open face. For example, when the shell 210 is a hollow cylinder, a circular end face of the cylinder may be an open face without a wall, and therefore, at the open face, an internal space of the shell 210 is in communication with an external space, making it convenient to place at least one electrode assembly 100 into a hollow space inside the shell 210 through the opening. When the shell 210 is a hollow cuboid, a lateral side of the cuboid may be an open face without a wall, and therefore, at the open face, the internal space of the shell 210 is in communication with the external space, making it convenient to place at least one electrode assembly 100 into the hollow space inside the shell 210 through the opening.

In this embodiment, the terminal assembly 220 may be disposed at the opening of the shell 210, and connected to the shell 210 to form a closed housing for accommodating the electrode assembly 100. The closed housing is filled with an electrolytic solution. The terminal assembly 220 may include an end cap 222 and a terminal 221 disposed on the end cap 222. The terminal 221 is configured to connect to the bend portions 161 of the tabs 160 of the first electrode plate 110 and the second electrode plate 120 separately.

Depending on the shape of the shell 210 and actual needs, the battery cell 200 may be a cylinder, a flat object, a cuboid, or another shape. The battery cell 200 may be, for example, a lithium-ion secondary battery, a lithium-ion primary battery, a lithium-sulfur battery, a sodium-lithium-ion battery, a magnesium-ion battery, or the like.

According to a third aspect, a battery 300 is further provided. The battery 300 includes the battery cell 200 according to the foregoing embodiment.

Figure 13:
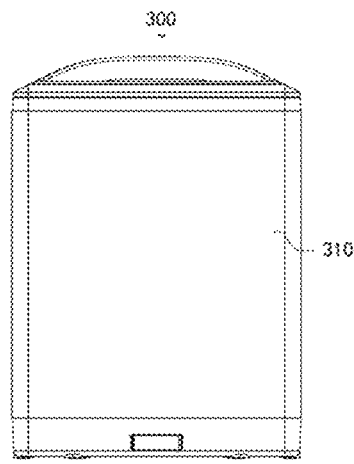
FIG. 13 is a schematic structural diagram of a battery according to some embodiments of this application.
Figure 14:
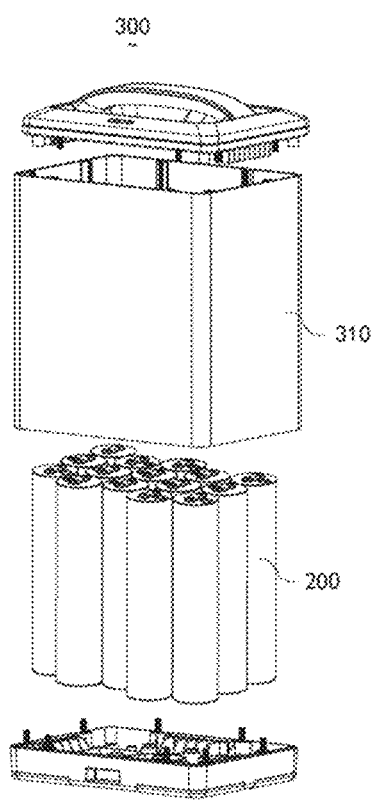
FIG. 14 is a schematic structural exploded view of a battery according to some embodiments of this application.

Refer to FIG. 13 and FIG. 14, which schematically show an overall structure and a breakdown structure, respectively, of a battery 300 according to some embodiments of this application.

In the embodiments shown in the drawings, the battery 300 may include one or more battery cells 200. The plurality of battery cells 200 may be connected in series, parallel, or series-and-parallel pattern, so as to meet different power use requirements. The battery 300 may further include a box 310. The box 310 is hollow inside, and is configured to accommodate one or more battery cells 200. The box 310 may be in different shapes and sizes depending on the shape, quantity, combination manner, and other requirements of the battery cells 200 to be accommodated. Similar to the shell 21 of the battery cell 200 described above, the box 310 of the battery 300 may form a closed structure by snap-fitting two parts.

Figure 15:
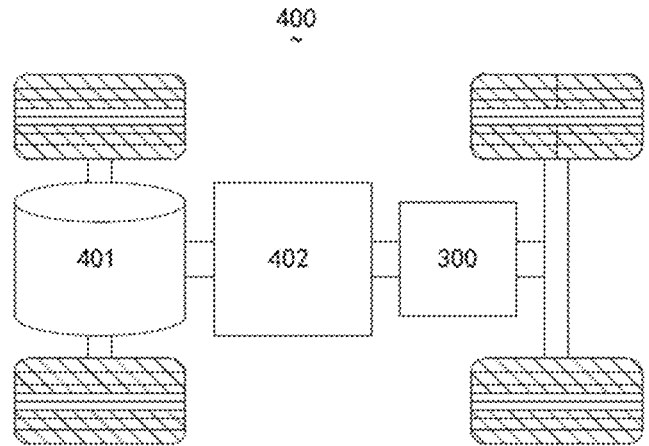
FIG. 15 is a schematic structural diagram of an electrical device according to some embodiments of this application.

According to a fourth aspect, an electrical device 400 is further provided. The electrical device includes the battery 300 according to the foregoing embodiment. The battery 300 is configured to provide electrical energy for the electrical device 400. Refer to FIG. 15, which schematically shows a structure of the electrical device 400 according to some embodiments of this application.

In this embodiment shown in the drawing, the electrical device 400 may be, for example, a vehicle. The vehicle may be an oil-fueled vehicle, a natural gas vehicle, or a new energy vehicle. The new energy vehicle may be a battery electric vehicle, a hybrid electric vehicle, a range-extended electric vehicle, or the like. The battery 300 is disposed inside the vehicle, or the battery 300 is disposed at the bottom, front, or rear of the vehicle. The vehicle may include a motor 401, a controller 402, and a battery 300. The battery 300 is configured to provide electrical energy for the vehicle. The controller 402 controls the battery 300 to supply power to the motor 401 to operate the motor 401, so as to drive wheels or other components of the vehicle to work.

A person skilled in the art understands that what is shown in the drawing is merely an example. In other embodiments, the electrical device 400 may be another device that includes the battery 300 and that is powered by the battery 300, for example, a mobile phone, a portable device, a notebook computer, an electric power cart, an electric vehicle, a ship, a spacecraft, electric toy, or a power tool. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, and an electrical planer.

In other embodiments, the battery 300 may serve as an operating power supply of the electrical device 400, and serve to power a circuit system of the electrical device 400, for example, to start or navigate a vehicle or meet operating power requirements of the vehicle; or the battery may further serve as a drive power supply of the electrical device 400 to provide driving power for the electrical device in place of or partially in place of oil or natural gas.

Figure 16:
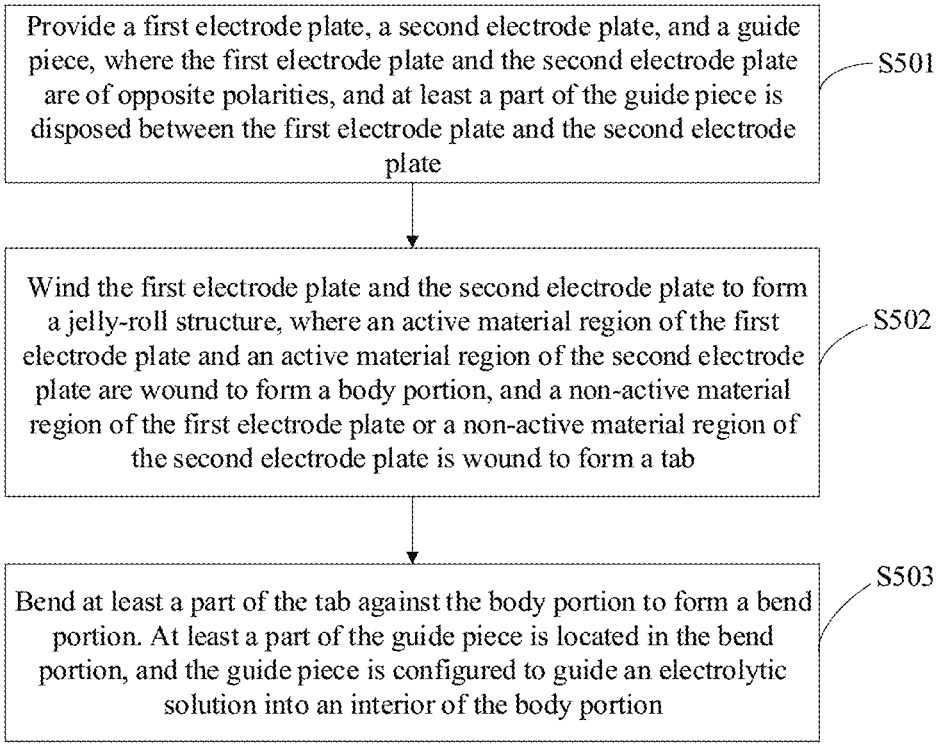
FIG. 16 is a schematic flowchart of a method for manufacturing an electrode assembly according to some embodiments of this application.

According to a fifth aspect, a method for manufacturing an electrode assembly is further provided. Refer to FIG. 16, which schematically shows a flowchart of a method for manufacturing an electrode assembly according to some embodiments of this application.

In this embodiment shown in the drawing, a method for manufacturing an electrode assembly includes the following steps:

S501: Providing a first electrode plate, a second electrode plate, and a guide piece, where the first electrode plate and the second electrode plate are of opposite polarities, and at least a part of the guide piece is disposed between the first electrode plate and the second electrode plate; S502: winding the first electrode plate and the second electrode plate to form a jelly-roll structure, where an active material region of the first electrode plate and an active material region of the second electrode plate are wound to form a body portion, and a non-active material region of the first electrode plate or a non-active material region of the second electrode plate is wound to form a tab; and S503: bending at least a part of the tab against the body portion to form a bend portion. At least a part of the guide piece is located in the bend portion, and the guide piece is configured to guide an electrolytic solution into an interior of the body portion.

In some embodiments, in step S501, the guide piece may be a stand-alone component, or pre-disposed on a surface of the first electrode plate and/or the second electrode plate. For example, in a case that the guide piece includes a third part and serves a function of a separator concurrently, the guide piece may be provided as a stand-alone component. In addition, the guide piece, the first electrode plate, and the second electrode plate may be die-cut in advance as required, so as to obtain specific shapes of the guide piece and the tab. In some embodiments, in a case that the guide piece includes at least two guide units, the guide units may be pre-disposed on a surface of the first electrode plate and/or the second electrode plate.

In some embodiments, during the winding operation in step S502, the jelly-roll structure may be a cylindrical jelly-roll structure, an oblate jelly-roll structure, or a rectangular jelly-roll structure.

In some embodiments, during the bending operation in step S503, the guide piece existent in the bend portion increases the dimension of the opening at the end of the bend portion to some extent, so that the electrolytic solution can smoothly pass through the opening, thereby improving the infiltration effect of the electrolytic solution for the active material region.

Figure 17:
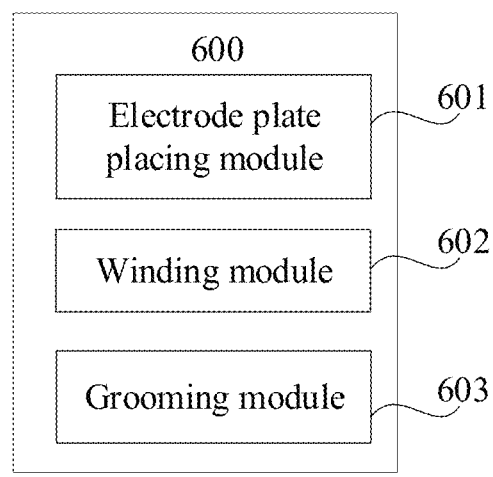
FIG. 17 is a schematic structural diagram of a device for manufacturing an electrode assembly according to some embodiments of this application.

According to a sixth aspect, a device for manufacturing an electrode assembly is further provided. Refer to FIG. 17, which schematically shows a structure of a device for manufacturing an electrode assembly according to some embodiments of this application.

In this embodiment shown in the drawing, the device 600 for manufacturing an electrode assembly includes: an electrode plate placing module 601, configured to provide a first electrode plate, a second electrode plate, and a guide piece, where the first electrode plate and the second electrode plate are of opposite polarities, and at least a part of the guide piece is disposed between the first electrode plate and the second electrode plate; a winding module 602, configured to wind the first electrode plate and the second electrode plate to form a jelly-roll structure, where an active material region of the first electrode plate and an active material region of the second electrode plate are wound to form a body portion, and a non-active material region of the first electrode plate or a non-active material region of the second electrode plate is wound to form a tab; and a grooming module 603, configured to bend at least a part of the tab against the body portion to form a bend portion. At least a part of the guide piece is located in the bend portion, and the guide piece is configured to guide an electrolytic solution into the interior of the body portion.

Finally, it should be noted that the foregoing embodiments are merely intended to describe the technical solutions of this application but not to limit this application. Although this application is described in detail with reference to the foregoing embodiments, a person of ordinary skill in the art understands that modifications may still be made to the technical solutions described in the foregoing embodiments, or equivalent replacements may still be made to some or all technical features thereof. The modifications and equivalent replacements, which do not make the essence of the corresponding technical solutions depart from the scope of the technical solutions of the embodiments of this application, fall within the scope of the claims and specification hereof. Particularly, to the extent that no structural conflict exists, various technical features mentioned in various embodiments can be combined in any manner. This application is not limited to this embodiments disclosed herein, but includes all technical solutions falling within the scope of the claims.

What is claimed is:

1. An electrode assembly comprising: a first electrode plate and a second electrode plate that are of opposite polarities and a guide piece disposed between the first electrode plate and the second electrode plate, wherein the first electrode plate, the guide piece, and the second electrode plate are wound along a winding direction to form a jelly-roll structure, an active material region of the first electrode plate and an active material region of the second electrode plate are wound to form a body portion of the jelly-roll structure, a non-active material region of the first electrode plate or a non-active material region of the second electrode plate is wound to form a tab, and the tab comprises a bend portion bent against the body portion, the bend portion comprises a plurality of bend layers extending from a circular surface of the body portion along the winding direction and arranged distanced from each other in a radial direction of the jelly-roll structure; and wherein at least a part of the guide piece is located in a space between at least two adjacent bend layers in the bend portion, and the guide piece is configured to guide an electrolytic solution into an interior of the body portion through the space between the at least two adjacent bend layers.

2. The electrode assembly according to claim 1, wherein at least one first guide path is disposed at the guide piece and/or the bend portion, one end of the first guide path being in communication with an exterior space of the electrode assembly, the other end being in communication with the interior of the body portion, and the guide piece being configured to guide the electrolytic solution into the interior of the body portion through the first guide path.

3. The electrode assembly according to claim 1, wherein the guide piece comprises at least two guide units, a second guide path is formed between two adjacent guide units, and the guide piece is configured to guide the electrolytic solution into the interior of the body portion through the second guide path.

4. The electrode assembly according to claim 1, wherein the guide piece comprises a first part and a second part, the first part is located in the bend portion, and the second part is connected to an outer end of the first part and extends to an exterior space of the electrode assembly.

5. The electrode assembly according to claim 4, wherein the guide piece further comprises a third part, and the third part is connected to an inner end of the first part and extends to a space between the active material region of the first electrode plate and the active material region of the second electrode plate.

6. The electrode assembly according to claim 1, wherein the guide piece is made of an insulation material, and a through-hole available for passage of ions is provided in a thickness direction of the guide piece.

7. The electrode assembly according to claim 1, wherein the electrode assembly further comprises a separator, wherein the separator is located between the active material region of the first electrode plate and the active material region of the second electrode plate, and the guide piece is attached to the separator, or the guide piece is spaced apart from the separator.

8. A battery cell comprising:
the electrode assembly according to claim 1;
a shell, configured to accommodate the electrode assembly; and
a terminal assembly, disposed on the shell and configured to connect to the bend portion to output or input electrical energy.

9. A battery comprising the battery cell according to claim 8.

10. An electrical device, comprising the battery according to claim 9, wherein the battery is configured to provide electrical energy.

11. A method for manufacturing an electrode assembly, characterized in that the method comprises:
providing a first electrode plate, a second electrode plate, and a guide piece, wherein the first electrode plate and the second electrode plate are of opposite polarities, and at least a part of the guide piece is disposed between the first electrode plate and the second electrode plate;

winding the first electrode plate, the guide piece, and the second electrode plate along a winding direction to form a jelly-roll structure, wherein an active material region of the first electrode plate and an active material region of the second electrode plate are wound to form a body portion of the jelly-roll structure, and a non-active material region of the first electrode plate or a non-active material region of the second electrode plate is wound to form a tab; and bending at least a part of the tab against the body portion to form a bend portion, wherein the bend portion comprises a plurality of bend layers extending from a circular surface of the body portion and arranged distanced from each other in a radial direction of the jelly-roll structure, at least a part of the guide piece is located in a space between at least two adjacent bend layers in the bend portion, and the guide piece is configured to guide an electrolytic solution into an interior of the body portion through the space between the at least two adjacent bend layers.

12. A device for manufacturing an electrode assembly comprising:

an electrode plate placing module, configured to provide a first electrode plate, a second electrode plate, and a guide piece, wherein the first electrode plate and the second electrode plate are of opposite polarities, and at least a part of the guide piece is disposed between the first electrode plate and the second electrode plate;

a winding module, configured to wind the first electrode plate, the guide piece, and the second electrode plate along a winding direction to form a jelly-roll structure, wherein an active material region of the first electrode plate and an active material region of the second electrode plate are wound to form a body portion of the jelly-roll structure, and a non-active material region of the first electrode plate or a non-active material region of the second electrode plate is wound to form a tab; and a grooming module, configured to bend at least a part of the tab against the body portion to form a bend portion, wherein the bend portion comprises a plurality of bend layers extending from a circular surface of the body portion and arranged distanced from each other in a radial direction of the jelly-roll structure, at least a part of the guide piece is located in a space between at least two adjacent bend layers in the bend portion, and the guide piece is configured to guide an electrolytic solution into an interior of the body portion through the space between the at least two adjacent bend layers.

* * * * *